Patented Apr. 8, 1941

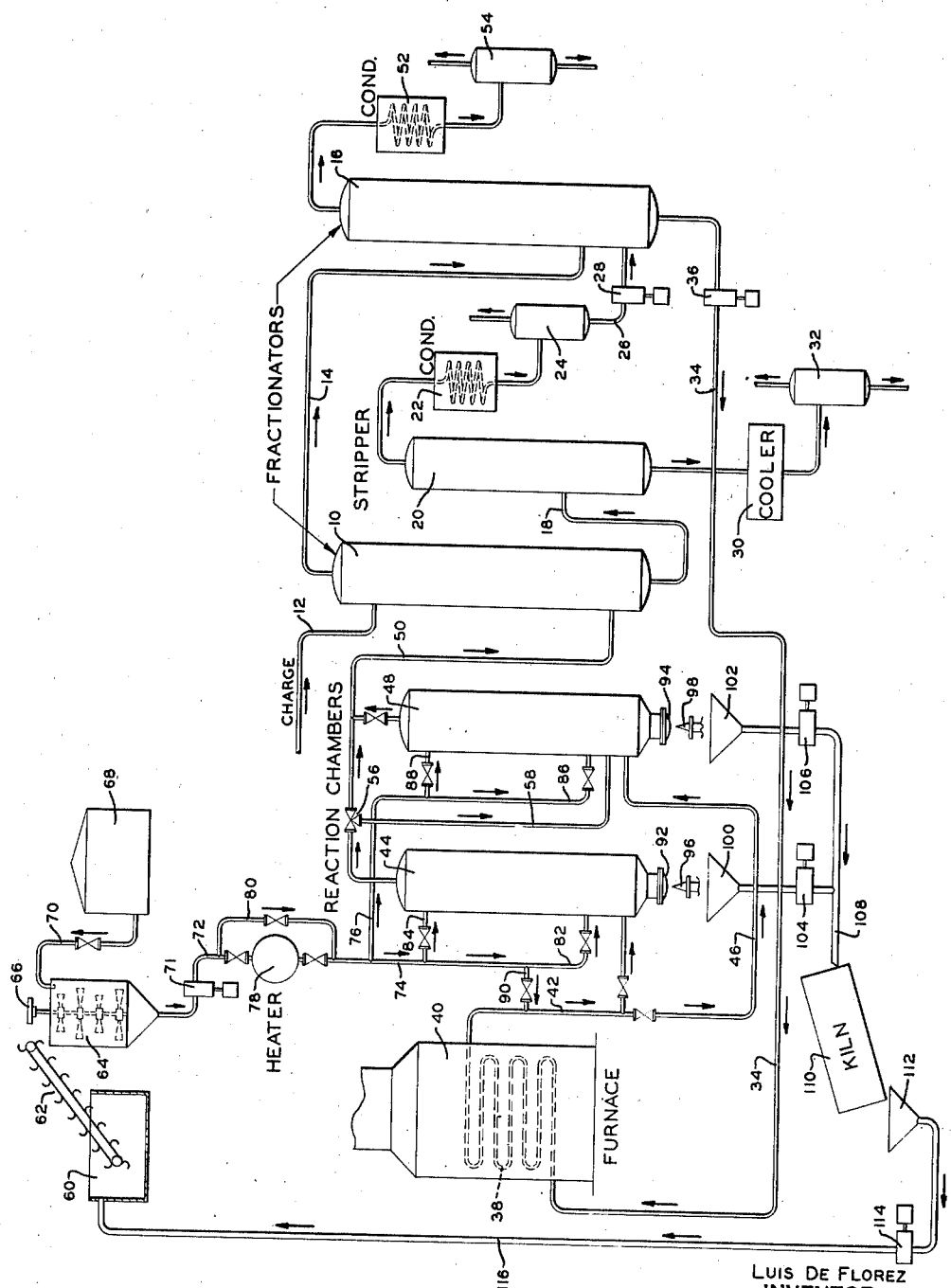

2,237,339

UNITED STATES PATENT OFFICE 2,237,339

APPARATUS FOR CRACKING HYDROCARBONS

Luis de Florez, Pomfret, Conn.

Application May 19, 1938, Serial No. 208,732

4 Claims. (Cl. 196—122)

This invention relates to the catalytic cracking of higher boiling point hydrocarbons to lower boiling point products, and more particularly to apparatus for continuously introducing a solid, adsorbent, catalytic material into hydrocarbon vapors under pressure and temperature conditions suitable for the cracking or conversion of the vapors.

The principal object of the invention is to produce cracked gasoline hydrocarbons of high antiknock value by cracking high boiling point oils in the presence of finely divided adsorbent materials introduced into the vapors thereof in a suitable reaction or conversion chamber in such a manner that the catalyst will be quickly and completely dispersed or disseminated therein to effect the greatest possible contact between the vapors and the catalyst. Another object is to provide a continuous cycle for the catalytic material whereby the spent catalyst can be readily recovered and revivified so that it can be recirculated.

In the catalytic cracking of hydrocarbons by a solid catalytic material, it has been the common practice to place this material, which may or may not be broken up into small pieces, in a reaction or conversion chamber where it will be contacted by the hydrocarbon liquid or vapor. The catalyst is sometimes placed on supports distributed throughout the chamber while occasionally it is merely placed in the bottom of the chamber. In order that the catalytic material may have its greatest effect, it is desirable to provide very intimate contact between the material and the hydrocarbons; and obviously when the catalyst is allowed to remain in relatively large pieces in a quiescent state within the reaction chamber, much of the beneficial effect which might otherwise be produced by the use of the catalyst is lost.

In accordance with the invention, the solid catalytic material, such as an adsorbent clay, fuller's earth, kieselguhr, bauxite or any other comminuted solid adsorbent material, is ground or pulverized and then mixed with a carrier liquid of a type which will be substantially inert with respect to the catalyst. Such a carrier may be water, benzol or other inert hydrocarbons or liquid compounds not affected by the catalyst and having a sufficient volatility to drop out the solid material at the temperatures used. For the purposes of this description, the carrier will be considered as water and the catalytic material will be referred to as clay.

The slurry or mixture of water and clay is introduced preferably into a reaction chamber containing the hydrocarbon vapors which may have a temperature of about 900° F. to 1100° F. and which may be under a pressure of approximately 100 to 300 lbs. per square inch. Because of the high temperature of the vapors the water in the slurry will be flashed off as fast as the slurry is introduced into the chamber, and because of this flashing or sudden evaporation of the water, the clay will be instantly dispersed or disseminated throughout the entire chamber, and in this manner extremely rapid and intimate contact between the hydrocarbon vapor and the clay will take place.

After a certain amount of the spent catalyst has collected in the bottom of the chamber, the chamber will be closed off and this spent catalyst will be removed from the bottom of the chamber in the manner in which coke is removed from a vertical coke drum. The spent catalyst removed from the chamber may be collected and passed to a kiln where any coke which may be present can be burned off. The revivified clay is then returned to the source where it may be again mixed with the water to form new slurry. It is intended that a plurality of reaction chambers will be used so that while one chamber is being cleaned another will remain in service, and in this manner the cracking may take place substantially continuously while at the same time the catalyst will be used in a continuous cycle.

For a better understanding of the invention, reference may be had to the accompanying drawing which is a diagrammatic elevational view of a vapor phase cracking system showing the manner of treating vapors with the catalyst.

Referring to the drawing, one form of the invention is shown as applied to a "clean circulation" cracking system in which the oil charge from any suitable source enters a fractionating column 10 through the pipe 12. In the column 10 the lighter components of the charge are vaporized and the heavier components of the cracked vapors are condensed to form a mixture of reflux condensate and unvaporized charge. The uncondensed vapors are passed through pipe 14 to a second fractionating column 16. Condensate from the column 10 passes through pipe 18 to a suitable stripping tower 20 and the vapors from the tower 20 are condensed at 22 and passed to a storage tank 24 from which liquid is passed through pipe 26 containing pump 28 to the column 16. The liquid residue from the tower 20 is cooled at 30 and passes to a suitable receiving drum 32.

A clean condensate recycle stock from the fractionating column 16 passes through a pipe 34 containing a pump 36 to the main heating coil 38 in a furnace 40. While passing through heating coil 38 the oil is vaporized and raised to a conversion temperature of about 900-1100° F. The vapors then pass through pipe 42 to a reaction chamber 44 or through pipe 46 to an alternate reaction chamber 48. In the reaction chambers 44 and 48 the oil vapors at about 100 to 300 lbs. or over per square inch pressure are brought into intimate contact with a solid adsorbent catalytic material in a manner to be described hereinafter. The converted vapors from the chambers 44 and 48 pass through pipe 50 to the fractionating column 10 where they contact, as has been previously described, the incoming oil charge at 12. As is stated hereinbefore, the vapors from the fractionating column 10 pass to the second fractionating column 16 and the vapors from the latter column are condensed at 52 and passed to a suitable receiving drum or other storage device 54. The two reaction chambers 44 and 48 are provided so that one may remain in use while the other is being cleaned by removing the spent catalyst therefrom. However, the pipe 50 is provided with a three way valve 56 and a pipe 58 connects this valve with the chamber 48 so that in case it is found desirable to pass the vapors through the two chambers 44 and 48 in series the valve 56 may be adjusted to pass the vapors from the chamber 44 directly to the chamber 48 from which they will pass through pipe 50 to the fractionating column 10.

In vapor phase catalytic cracking it is necessary that extremely intimate contact be provided between the vapors to be converted and the catalyst and to this end the following arrangement has been provided. A tank or receptacle 60 adapted to contain the solid adsorbent catalytic material is provided with a suitable conveyor or other means 62 for continuously supplying catalytic material from the tank 60 to a mixing tank 64. The catalytic material is preferably a finely divided, adsorbent clay such as Attapulgus clay, fuller's earth, diatomaceous earth, kieselguhr or bauxite, although an acid treated clay having a high adsorptive capacity such as "Filtrol" is preferred. The tank 64 preferably contains a mixing device 66 and in this tank the finely divided clay is mixed with a carrier liquid such as water is supplied to the mixing tank 64 from a tank 68 through a pipe connection 70. As a carrier fluid other materials inert to the catalyst may be used such as benzol or other refractory hydrocarbons or chemical compounds having sufficient volatility to drop out the solid material at the temperatures used. The carrier liquid and the clay are thoroughly mixed in the tank 64 to form a slurry which is forced by means of pump 71 through the pipe 72 and either the pipe 74 or pipe 76 to the reaction chamber 44 or the chamber 48 depending on which one is being used. The slurry may be preheated if it is found desirable as at 78 but a valve controlled by-pass 80 is provided around this heater so that the slurry may be injected into the reaction chambers while cold, if this is found preferable. The slurry may be injected into the lower portion of the reaction chamber 44 through valve controlled pipe 82 or into the upper part of the reaction chamber 48 through the valve controlled pipe 84. Likewise, if the reaction chamber 48 is being used instead of the chamber 44, the slurry may enter the lower or upper portions of the chambers at 86 or 88 respectively. It may be found desirable in certain instances to pass the slurry into the oil vapors before they reach the reaction chambers, and to this end a valve controlled pipe 90 connects the pipe 74 with the pipe 42.

As the slurry enters the reaction chamber the carrier fluid is instantly flashed off because of the high temperature of the oil vapors in the chamber and it has been found that this flashing action or sudden evaporation of the carrier causes the catalyst to be quickly and completely dispersed or disseminated through the hot oil vapors within the chamber. Because of the great difference in temperature between the slurry and the vapors in the chamber, the flashing off of the carrier fluid approaches an explosive action and in this manner an extremely intimate contact is obtained between the finely divided catalytic material and the hot vapors. When a predetermined amount of spent catalyst has collected for instance in reaction chamber 44, this chamber is shut off and the chamber 48 placed in use.

The spent catalytic material collecting in the reaction chambers is removed in a manner similar to the removal of coke from a coke drum. The bottom cover 92 or 94 of the reaction chamber which is to be cleaned is removed and a suitable drilling or boring device 96 or 98 is caused to enter the bottom of the chamber so as to drill out the spent clay. The clay so removed from the reaction chambers is collected in hoppers 100 or 102 leading to suitable pumping devices 104 or 106 which serve to force the spent material through a pipe or conduit 108 to a rotary kiln 110. In the kiln any tar or coke which may be mixed with the spent catalyst is burned off and the revivified clay is then collected at hopper 112 and forced by means of a suitable pump or other device 114 through conduit 116 back to the tank 60.

As an example of the operation of the invention, a charging stock such as crude oil, reduced crude, gas oil, or heavy naphtha, is contacted in a primary dephlegmating tower with cracked vapors from the system, whereby the lighter constituents of the charge are vaporized and the heavier components of the cracked vapors condensed. The liquid collecting in the bottom of the tower, comprising unvaporized charge and heavy reflux condensate, is subjected to a stripping operation to distil off the more volatile constituents thereof as a condensate leaving a fuel oil residue. The condensate is introduced as a reflux into a secondary dephlegmating tower receiving the uncondensed vapors from the aforementioned primary dephlegmating tower. A gasoline distillate is recovered overhead from the secondary dephlegmator while the reflux condensate, comprising a clean distillate recycle stock is charged to the cracking coil. In the cracking coil the clean recycle stock is raised to a temperature of about 1000° F. under a pressure of about 100 to 200 pounds, and the hot products in the vapor phase are transferred to a reaction drum wherein they are intimately contacted with a catalyst comprising acid treated clay introduced into the reaction drum as a water slurry. After contacting with vapors, the clay settles out in the lower portion of the reaction drum while the vapors pass overhead to the primary dephlegmating zone, mentioned heretofore. The clay settling out in the lower portion of the reaction drum is intermittently removed by cutting out one reaction drum and passing the cracked products to another reaction drum. The clay removed from the tower is burned in a rotary kiln to burn off adhering tar and coke and the revivified clay is recycled to the reaction drum as a slurry. A yield of gasoline of about 60% based on furnace charge with anti-knock value of about 78 may be obtained.

As will be seen, a substantially continuous cycle has been provided for the catalytic adsorbent material and through the provision of two reaction chambers the entire cracking process may be carried on continuously. Because of the intimate contact secured between the finely divided clay and the hot vapors the octane rating of the gasoline produced will be exceptionally high. By revivifying and recirculating the clay the cost of the catalytic treatment is kept low.

The apparatus of the present invention is capable of being practiced successfully in a number of ways and it is not intended that its spirit and scope be limited by the descriptive terms employed other than by the appended claims.

I claim:

1. In an apparatus for the conversion of hydrocarbon oil by vapor phase reaction, a heater for vaporizing the oil, an enlarged conversion chamber into which the heated vapors are flashed, means for injecting into said chamber a mixture of finely divided adsorbent clay and water to aid in converting said vapors, means for drilling the spent clay and coke formed in the conversion from said reaction chamber, a kiln for revivifying the removed clay by burning coke and other impurities therefrom and means for mixing said revivified clay with fresh clay and water to form new slurry to be injected into said conversion chamber.

2. In apparatus for the catalytic treatment of fluid hydrocarbons, means for heating said hydrocarbons, an enlarged reaction chamber into which the hot hydrocarbons are passed, mixing means for forming a slurry of a finely divided adsorbent catalytic material and a carrier liquid, pump means for forcing said slurry into said reaction chamber so that the catalytic material will be disseminated in said hot hydrocarbons by the sudden evaporation of the carrier liquid, means for drilling the spent catalytic material from the reaction chamber, together with coke formed therein and a kiln for revivifying the spent catalytic material and means for returning said material to said mixing means to be recirculated.

3. In an apparatus for the conversion of hydrocarbon oil by vapor phase reaction, a heater for vaporizing the oil, an enlarged conversion chamber into which the heated vapors are flashed, means for injecting into said chamber a mixture of finely divided adsorbent clay and water to aid in converting said vapors, boring means for cutting and removing the spent clay and coke formed in the conversion from said reaction chamber, a kiln, means for collecting and conveying said removed clay to said kiln so that coke and other impurities can be burned therefrom, and means for mixing the revivified clay with fresh clay and water to form new slurry to be injected into said conversion chamber.

4. In apparatus for the catalytic treatment of fluid hydrocarbons, means for heating said hydrocarbons, an enlarged reaction chamber into which the hot hydrocarbons are passed, mixing means for forming a slurry of a finely divided adsorbent catalytic material and a carrier liquid, pump means for forcing said slurry into said reaction chamber so that the catalytic material will be disseminated in said hot hydrocarbons by the sudden evaporation of the carrier liquid and means for revivifying the spent catalytic material and returning said material to said mixing means to be recirculated, said revivifying means comprising a boring device for cutting and removing the spent clay and coke from said reaction chamber, a kiln, means for collecting and conveying said removed clay to said kiln so that coke and other impurities can be burned therefrom, and means for mixing the revivified clay with fresh clay and carrier liquid to form new slurry to be injected into said conversion chamber.

LUIS DE FLOREZ.